United States Patent [19]
Giesken

[11] 3,816,668
[45] June 11, 1974

[54] ARRANGEMENT FOR PROVIDING SWITCHED RANGE EXTENSION

[75] Inventor: Kenneth Frank Giesken, Westerville, Ohio

[73] Assignee: Bell Telephone Laboratories, Incorporated, Murray Hill, N.J.

[22] Filed: Nov. 15, 1972

[21] Appl. No.: 306,604

[52] U.S. Cl. .......................... 179/18 EA, 179/16 F
[51] Int. Cl. .......................................... H04m 3/00
[58] Field of Search ...................... 179/18 EA, 16 F

[56] References Cited

UNITED STATES PATENTS

| | | | |
|---|---|---|---|
| 3,339,027 | 8/1967 | Feiner et al. | 179/16 F |
| 3,493,686 | 2/1970 | Spittler et al. | 179/16 F |
| 3,541,267 | 11/1970 | Fukutomi et al. | 179/18 EA |

*Primary Examiner*—Kathleen H. Claffy
*Assistant Examiner*—Douglas W. Olms
*Attorney, Agent, or Firm*—D. E. Nester

[57] ABSTRACT

An arrangement is disclosed in a multistage switching system for providing range extension to lines exceeding a predetermined length. Range extension circuitry is included in some of the interstage links accessible to "long lines" as well as in loop-around lines having dual appearances in the switching system. As a first choice, a network connection is established to a "long line" via one of the idle interstage links equipped with range extension circuitry. However, if an idle network connection cannot be found via one of these equipped links, as a second choice the connection is established via a loop-around line adapted to provide range extension.

5 Claims, 3 Drawing Figures

ARRANGEMENT FOR PROVIDING SWITCHED RANGE EXTENSION

FIELD OF THE INVENTION

This invention relates to communication switching systems and, more particularly, to telephone switching systems including range extension facilities for servicing subscriber lines which are greater than a predetermined length.

BACKGROUND OF THE INVENTION

The impedance of a subscriber's line (the wire path between a telephone station and a switching office) varies in accordance with the length of the line. Subscribers' stations which are a relatively great distance from a switching office are served by lines having a substantially higher impedance than the lines serving stations nearer to the office. The high impedance of these so-called "long lines" degrades the signals conveyed thereover to an unacceptable transmission level.

In the past, several corrective measures were taken to provide adequate service to the stations served by these long lines. In one prior arrangement, the diameter of the wire pairs serving these marginal stations was increased. This decreased the impedance of these lines in comparison to a corresponding length of narrower gauge wire so that the overall impedance of these long lines was comparable to normal length lines. This arrangement was operative but exhibited several disadvantages. The heavier gauge wire pairs were bulkier and harder to handle than the conventional gauge wire pairs. Furthermore, the cables binding these heavy gauge wire pairs necessarily contained fewer wire pairs per standard diameter than cables binding conventional wire pairs. In congested metropolitan areas where underground conduit capacity may be fully utilized, the use of cables with heavy rather than conventional gauge wire pairs means that fewer customers can be serviced per square inch of conduit cross section area.

In another prior arrangement disclosed in A. Feiner, A. Zarouni, C. W. Zebe U.S. Pat. No. 3,339,027, issued Aug. 29, 1967, long lines are serviced by range extension circuitry in the link circuits extending between the switches of a crossbar line link frame. In this arrangement, the termination of long lines on the line link frame are relegated only to horizontal groups having special link circuits adapted to provide range extension. This restriction imposes barriers with respect to assigning line terminations in a manner as to distribute traffic load and to minimize terminal interconnections. Moreover, if a horizontal group serves any long lines, all of the link circuits associated with the group must necessarily be adapted to provide range extension irrespective of the actual number of long lines served by the central office. This is very inefficient since the number of range extension circuits can exceed the number of lines requiring such treatment.

It is an object of this invention to minimize the number of range extension circuits required to service long lines.

It is a further object of this invention to efficiently and economically provide range extension without relegating the long lines to segregated network appearances in a switching system.

SUMMARY OF THE INVENTION

In accordance with one illustrative embodiment of the principles of this invention, range extension circuitry is included in some of the interstage links accessible to network appearances of long lines, as well as in loop-around lines having both a line and a trunk network appearance in the switching system. A common control, upon ascertaining that a network connection is to be established between the termination of a long line and a desired trunk termination, first attempts to establish the connection via one of the interstage links accessible to the long line and equipped with a range extension circuit. However, if a network connection cannot be found via one of these equipped interstage links, the common control then controls the switching network to establish the connection via one of the loop-around lines. This is accomplished by establishing a first network connection between the termination of the long line and the trunk appearance of a selected loop-around line, and by establishing a second network connection between the line appearance of the selected loop-around line and a desired trunk termination.

It is a feature of this invention to provide range extension capability via a loop-around line on a contingency basis when and only when an idle path cannot be found via one of the links equipped with range extension circuitry.

It is a further feature of this invention that all the interstage links accessible to long lines do not have to be equipped with range extension circuits, but rather only a limited number of these links need be so equipped.

GENERAL DESCRIPTION

Figures 1, 3:
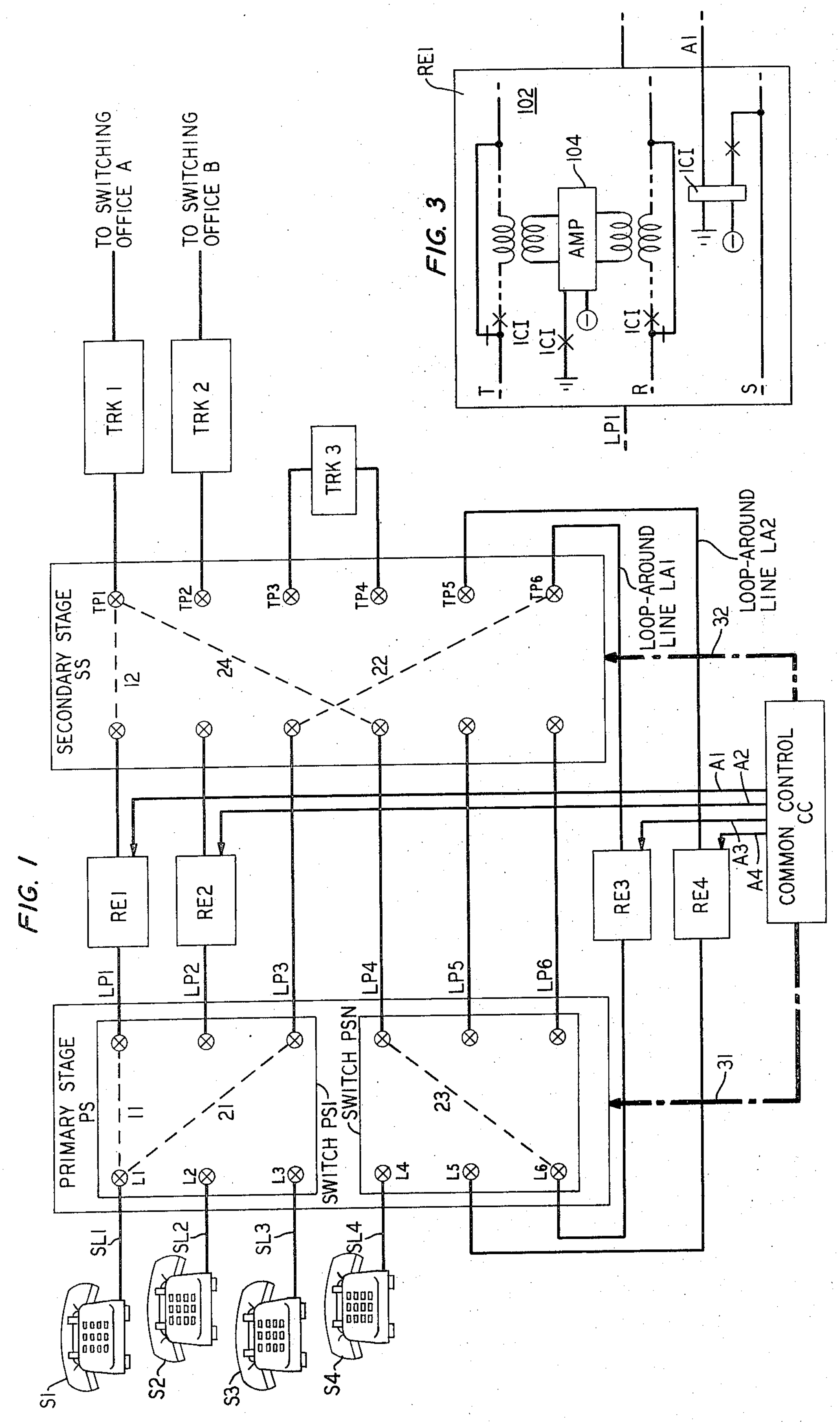
FIG. 1 is a block diagram of a telephone switching system illustrative of one specific embodiment of my invention.
FIG. 3 shows in greater detail a range extension circuit such as RE1 depicted in FIG. 1.

FIG. 1 is a block diagram depicting a telephone switching system in which range extension is provided to lines exceeding a predetermined length in accordance with the principles of this invention. As hereinafter described, range extension is selectively provided under the control of common control CC by range extension circuits RE1 and RE2 inserted in link paths LP1 and LP2 between switching stages PS and SS as well as by range extension circuits RE3 and RE4 inserted in loop-around lines LA1 and LA2.

In an effort to simplify the description as much as possible consistent with the full disclosure of this invention, only four telephone stations S1–S4 have been illustrated. However, these stations are merely representative of a larger plurality of such stations which would be served by an actual telephone switching system.

Communication service is provided to telephone stations S1–S4 over subscribers' lines SL1–SL4, respectively. Each of these subscribers' lines is a wire pair having an impedance related to the length of the line and the diameter of the wires. In this illustrative embodiment, subscribers' lines SL1 and SL3 are so-called "long lines" which have an impedance substantially higher than a normal line. When a call is instituted by or directed to either station S1 or S3, range extension must be provided to amplify the signals conveyed over the corresponding long line SL1 or SL3. Stations S2 and S4 are served by normal lines and range extension is not required for calls associated with these stations. As will hereinafter be described more fully, long lines and normal length lines are not relegated to segregated appearances on primary stage PS.

Primary stage PS and secondary stage SS form a 2-stage switching network which is selectively controllable to establish communication paths from any of the line terminations L1–L6 to any of the trunk terminations TP1–TP6. As illustrated in FIG. 1, primary stage PS comprises two separate switches PS1 and PSN. Switch PS1 comprises a switching array for establishing connections between line terminations L1–L3 and link paths LP1–LP3. Similarly, switch PSN comprises a switching array for establishing connections between line terminations L4–L6 and link paths LP4–LP6. In accordance with the illustrated network topology, link paths LP1–LP3 are said to be accessible to line terminations L1–L3 since it is possible to establish direct connections therebetween. In contrast, link paths LP4–LP6 are said to be inaccessible to line terminations L1–L3 since it is not possible to directly establish connections between these terminations and these paths. Similarly, link paths LP4–LP6 are accessible to line terminations L4–L6 and inaccessible to line terminations L1–L3. Secondary stage SS comprises a single switching array which is selectively controllable to establish connections between link paths LP1–LP6 and trunk terminations TP1–TP6.

Advantageously, in accordance with this invention, all of the link paths accessible to long lines do not have to be equipped with range extension circuitry, but rather only a limited number of these accessible links need be so equipped. Link paths LP1–LP3 are accessible to long lines SL1 and SL3 but only link paths LP1 and LP2 are equipped with range extension circuitry. Indeed only a single accessible link path need be equipped. In contrast, in accordance with the teachings of the above-specified A. Feiner et al. patent all of the link paths accessible to long lines would necessarily have to be equipped with range extension apparatus.

Primary stage PS and secondary stage SS are selectively controlled by common control CC which comprises well-known apparatus for controlling the establishment of network connections. To provide communication service common control CC, in accordance with well-known teleprocessing techniques, processes each call through the basic stages of call processing. These stages include (1) detection of a service request, (2) signaling the calling station that the request has been detected, (3) reception and interpretation of dial digits, (4) identification of the calling line, (5) determination of the calling line's class of service, the destination of the call, the call treatment required, and the appropriate route to the destination, (6) selection and storage of the identity of the network terminations to be interconnected, (7) controlling the network to set up the connection, (8) alerting the called station on certain types of calls, (9) detection of answer by the called station for charging purposes, and (10) detection of disconnect by either party. Apparatus for performing the above-specified functions is extremely well known in the telephone art. These functions are performed by common control apparatus inherently or in combination with other peripheral apparatus.

Trunk circuits TRK1 and TRK2 are well-known 2-way trunk circuits utilized in establishing 2-wire audio communication paths to other switching offices not depicted in the drawing. Trunk circuit TRK3 is a well-known intraoffice trunk utilized in establishing audio communication paths between stations S1–S4. These trunks are representative of a much larger number and variety of such trunks which would be utilized in an actual installation.

In accordance with this illustrative embodiment of my invention, range extension is selectively provided to stations S1 and S3 by one of the range extension circuits RE1–RE4 under the control of common control CC. An example of a suitable range extension circuit is range extender circuit 102 depicted in FIG. 1 of the aforementioned A. Feiner et al. patent. Only those elements of circuit 102 which are essential to an understanding of my invention are depicted in FIG. 3 of my drawing. As shown in FIG. 3 in regard to range extension circuit RE1, each of the range extension circuits RE1–RE4 includes an actuatable amplifier 104 for amplifying audio signals directed to or conveyed over a long line. The circuit elements in each of the range extension circuits RE1–RE4 include those depicted in FIG. 3.

When one of the telephone stations S1–S4 institutes a call, the off-hook status of the station is detected and dial tone is returned to the calling station. A network connection is established from the line termination of the line serving the calling station to a register (not shown) adapted to receive the digits dialed by the calling station. After identifying the calling line, common control CC ascertains the calling line's class of service to determine if range extension is required. Common control CC selects a termination on secondary stage SS in accordance with the dialed digits and stores the identity of the terminations to be interconnected. If the calling station does not require range extension, common control CC processes the call in accordance with its normal sequence of operations.

Figure 2:
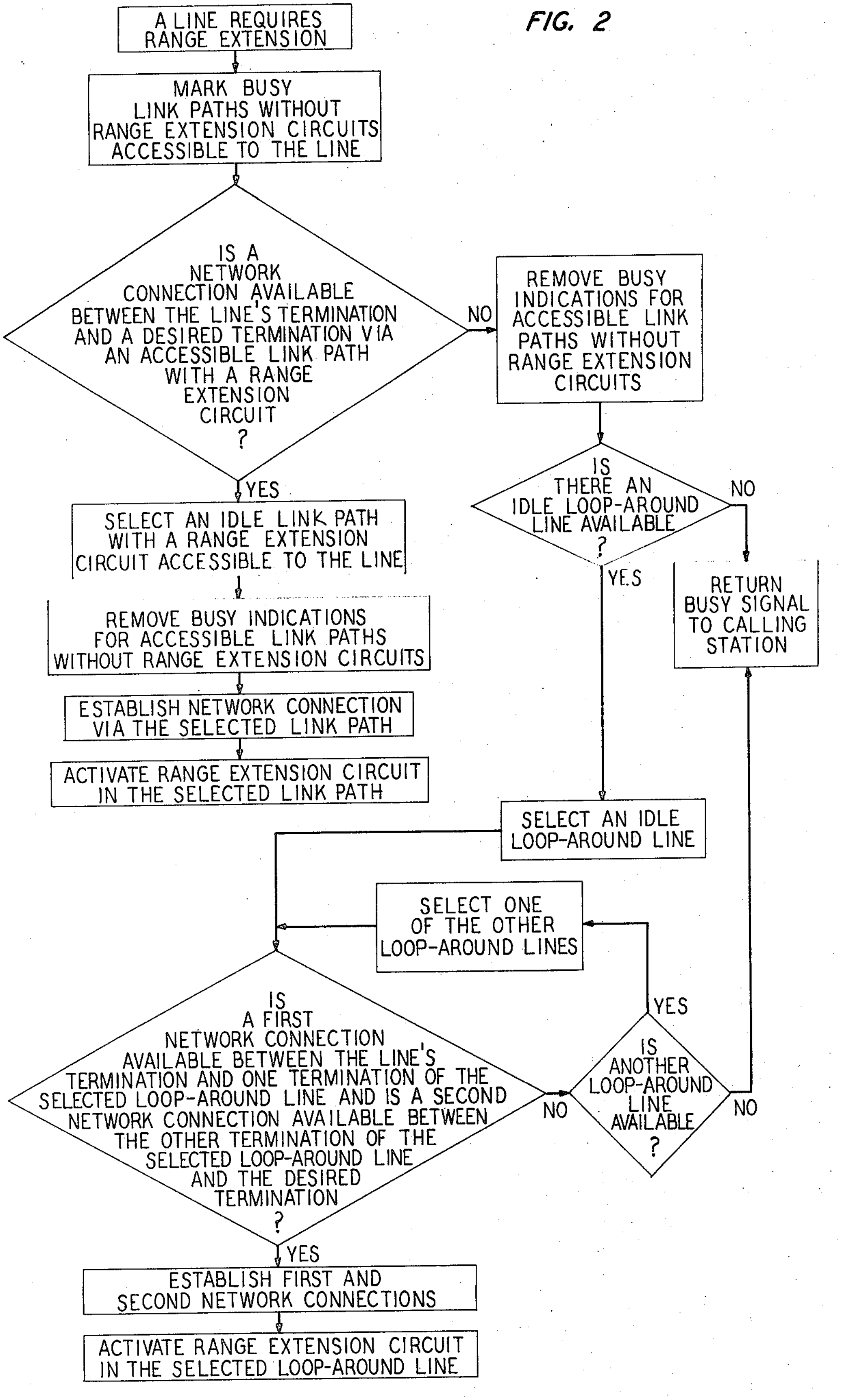
FIG. 2 is a flowchart illustrating a logical sequence of operations utilized by common control CC of FIG. 1 in controlling the provision of range extension in the telephone switching system.

If the calling station does require range extension, common control CC, in accordance with the logical sequence of operations flowcharted in FIG. 2, ascertains if the desired network connection between the line termination of the calling line and the desired trunk termination can be established via one of the link paths accessible to the long line and equipped with range extension circuitry. In this illustrative embodiment, common control CC ascertains if the desired network connection can be established via either link paths LP1 or LP2 so that range extension may be beneficially provided by the corresponding range extension circuit RE1 or RE2. However, if the equipped interstage link paths are already busy, common control CC, as a second choice in accordance with the sequence of operations depicted in FIG. 2, attempts to provide range extension by establishing the desired network connection via either looparound line LA1 or LA2 so that the corresponding range extension circuit RE3 or RE4 can be enabled to provide range extension.

When a connection is established requiring range extension and the called station goes off-hook, common control CC detects this condition and selectively activates the range extension circuit RE1–RE4 through which the connection was established by applying an enable signal to the corresponding lead A1–A4. This enable signal activates a relay 1CI in the range extension circuit which switches an amplifier 104 across the communication path and opens the bypass paths around the amplifier, as shown in FIG. 3.

Range extension circuits RE1–RE4 are also used to provide range extension for terminating calls directed to long lines serviced by the depicted switching system. These calls can originate in either the depicted system or in other systems not shown.

SPECIFIC DESCRIPTION

In order to facilitate an understanding of the principles of this invention, we will consider an illustrative example in which a communication path is established from telephone station S1 to a distant switching office A via trunk circuit TRK1. Station S1 initiates a call by going off-hook. Common control CC detects this service request and returns dial tone to the calling station via long line SL1. A network connection is established from line termination L1 of long line SL1 to a dial pulse register (not shown) adapted to receive the dial digits generated by station S1. The information specified by these digits is conveyed from the dial pulse register to common control CC. Common control CC then identifies the calling line, determines the class of service assigned the line, and processes the dialed digits to determine the destination of the call. Common control CC also determines an appropriate route to this destination and stores information specifying the line termination of the calling line, as well as the trunk termination to which the line is to be connected. In this illustrative example, common control CC ascertains that the desired communication path can be established via trunk circuit TRK1 and stores information identifying trunk termination TP1 of this trunk and line termination L1 of the calling line.

As previously mentioned, common control CC determines the class of service associated with the calling line and ascertains from it whether or not range extension must be provided. In this example, the class of service associated with long line SL1 indicates that range extension is required, and common control CC utilizes a special sequence of operations to control the provision of range extension. FIG. 2 shows one illustrative logic sequence utilized to control the provision of range extension in the switching system depicted in FIG. 1.

In accordance with this sequence, common control marks busy link path LP3 which is the only link path accessible to long line SL1 not equipped with a range extension circuit. Common control CC then performs a path hunt to determine if an idle network connection is available between line termination L1 and trunk termination TP1 of trunk circuit TRK1. In arrangements wherein common control CC includes a memory map specifying the idle or busy status of all links and other network paths, the unequipped paths can be marked busy by simply masking the bits defining the status of these unequipped links in the course of searching for an idle path in the usual fashion. A path hunt operation in which this masking technique can be readily implemented is explained in an article by A. Feiner and W. S. Hayward entitled "No. 1 ESS Switching Network Plan" beginning on page 2193 of Vol. 43 of the Bell System Technical Journal of Sept. 1964.

In other arrangements wherein common control CC is of the electromechanical variety, this marking links busy task can be accomplished by operating selected relays which inhibit the idle link sensing paths associated with these unequipped links, thereby preventing the selection of an unequipped link for use in the establishment of a network connection.

In this example, common control CC ascertains that link path LP1 is idle and that a network connection can be established thereover between line termination L1 and trunk termination TP1. Common control CC then removes the busy indication previously associated with link path LP3 so that this link can be used in establishing other network connections. Common control CC then controls primary stage PS via cable 31 to establish connection 11 between line termination L1 and link path LP1. Common control CC also controls secondary stage SS via cable 32 to establish connection 12 between link path LP1 and trunk termination TP1. When common control CC receives information which indicates that the called station in switching office A has gone off-hook, it activates range extension circuit RE1 in link path LP1 by applying an enable signal to lead A1 which is uniquely associated with this circuit. As shown in FIG. 3, the enable signal conveyed over lead A1 to range extension circuit RE1 actuates relay 1CI. The contacts of this relay apply a ground potential to amplifier 104 to activate the amplifier, open the bypass paths around the amplifier, and keep relay 1CI actuated by closing a holding path to the sleeve lead.

Thus, audio signals are bilaterally conveyed between station S1 and switching office A over the following route: long line SL1, connection 11, link connection LP1, connection 12, and trunk circuit TRK1. These audio signals are amplified by amplifier 104 in range extension circuit RE1, thereby overcoming the high impedance of long line SL1.

Provision of Range Extension Via the Loop-Around Lines

In the previous example, link path LP1 was idle and range extension circuit RE1 could therefore be utilized to provide range extension to station S1. However, if common control CC had determined during its path hunt operation that link paths LP1 and LP2 were both unavailable for establishing the desired network connection, common control CC would further control the sequence of operations illustrated in FIG. 2 to determine if range extension could be provided by establishing the desired network connection via one of the loop-around lines LA1 or LA2.

Upon determining that link paths LP1 and LP2 are busy, common control CC removes the busy indication previously associated with link path LP3 and determines if there is an idle loop-around line. If an idle loop-around line is not available, common control CC causes line termination L1 to be connected to a busy trunk (not shown) thereby informing station S1 that the call cannot be completed at this time.

However, upon determining that loop-around line LA1 is idle, common control CC performs a first path hunt from line termination L1 to trunk termination TP6 and also performs a second path hunt from line termination L6 of loop-around line LA1 to trunk termination TP1 of trunk circuit TRK1. Upon ascertaining that both the above-described network connections can be established, common control CC controls primary stage PS to establish connection 21 between line termination L1 and link path LP3 and to establish connection 23 between line termination L6 and link path LP4. Common control CC also controls secondary stage SS to establish connection 22 between link path LP3 and trunk termination TP6 and to establish connection 24 between link path LP4 and trunk termination TP1. When the called station goes off-hook and common control CC is so informed, it activates range extension circuit RE3 in loop-around line LA1 by applying an enable signal to lead A3. Audio signals are conveyed between station S1 and switching office A over the following route: long line SL1, connection 21, link path LP3, connection 22, loop-around line LA1, connection 23, link path LP4, connection 24, and trunk circuit TRK1.

Thus, when none of the interstage link paths accessible to a long line and equipped with a range extension circuit is not available to establish a desired connection, range extension is respectively provided by either range extension circuit RE3 or RE4. This is accomplished by establishing a first connection from the termination of the long line to the trunk termination of a loop-around line via one of the accessible unequipped link paths and by establishing a second network connection from the line termination of the selected loop-around line to the desired trunk termination.

When a call is instituted by or directed to one of the stations serviced by normal lines, common control CC determines the class of service associated with the calling line which indicates that range extension is not required. Common control CC then causes the desired network connection to be established via any of the link paths LP1–LP6, but does not later activate the range extension circuit through which the connection was established. Thus, long lines and normal lines need not be relegated to segregated appearances on primary stage PS.

What is claimed is:

1. In combination, a switching network having at least two stages with link paths therebetween, said network selectively controllable to establish communication paths between terminations on said network via said stages and said link paths, a loop-around line having a first termination on one of said stages and a second termination on another of said stages, and range extension means in less than all of said link paths and in said loop-around line.

2. The combination according to claim 1 further comprising control means for controlling said switching stages:

1. as a first choice to establish a communication path between a line termination on said network and another termination on said network via an idle one of said link paths having a said range extension means, and,
2. as a second choice, in the absence of an idle one of said link paths having a said range extension means, to establish a first communication path between said line termination and said first termination of said loop-around line, and to establish a second communication path between said other termination and said second termination of said loop-around line.

3. The combination according to claim 2 further comprising, a line having an impedance exceeding a predetermined limit connected to said line termination, and means in each of said range extension means connected with and responsive to said control means for actuating said each range extension means.

4. In a communication switching system wherein at least two switching stages having link paths therebetween are selectively controllable to establish communication paths between terminations on said stages via said link paths, some of said terminations are connected to lines, and certain of said lines have an impedance exceeding a predetermined limit, the combination comprising, a plurality of loop-around lines each having a first termination on one of said stages and a second termination on another of said stages, a range extension circuit in each of said loop-around lines and in some of said link paths, and control means for controlling said switching stages, in accordance with information specifying a line termination of one of said certain lines and another termination between which a communication path is to be established, 1. as a first choice, to establish a communication path between said line termination of said one certain line and said other termination via an idle one of said link paths having a range extension circuit, and,
2. as a second choice, in the absence of an idle one of said link paths having a range extension circuit, to establish a first communication path between said line termination of said one certain line and said first termination of one of said loop-around lines, and to establish a second communication path between said other termination and said second termination of said one loop-around line.

5. An arrangement for providing range extension comprising:

1. a switching network having at least two stages with link paths therebetween, said stages having line and other terminations thereon, certain of said line terminations being connected to lines having an impedance exceeding a predetermined limit, said stages being controllable to establish communication paths between said certain line terminations and said other terminations via link paths accessible to said certain line terminations;
2. amplification means in each of said accessible link paths;
3. control means for controlling said stages to establish a communication path between one of said certain line terminations and one of said other terminations via an idle one of said accessible link paths;

said arrangement CHARACTERIZED IN THAT the arrangement further comprises:

1. at least one additional link path accessible to said certain line terminations without amplification means;
2. a loop-around line having a first termination on one of said stages and a second termination on another of said stages;
3. amplification means in said loop-around line; and said control means, in the absence of an idle one of said accessible link paths with amplification means, controls said stages to establish a first communication path between said one certain line termination and said first termination of said loop-around line via one of said additional link paths, and to establish a second communication path between said second termination of said loop-around line and said one other termination.

* * * * *